United States Patent [19]

White

[11] Patent Number: 5,726,831
[45] Date of Patent: *Mar. 10, 1998

[54] METHODS FOR OPERATING A GAS BEARING SLIDER

[76] Inventor: James W. White, 154 Milmar Way, Los Gatos, Calif. 95032

[*] Notice: The term of this patent shall not extend beyond the expiration date of Pat. No. 5,404,256.

[21] Appl. No.: 660,790

[22] Filed: Jun. 6, 1996

Related U.S. Application Data

[63] Continuation of Ser. No. 353,771, Dec. 9, 1994, which is a continuation-in-part of Ser. No. 987,508, Dec. 7, 1992, Pat. No. 5,404,256.

[51] Int. Cl.$^6$ .............................. G11B 5/60; G11B 17/32
[52] U.S. Cl. ........................................................... 360/103
[58] Field of Search ............................ 360/103, 97.02, 360/102

[56] References Cited

U.S. PATENT DOCUMENTS

| | | |
|---|---|---|
| 3,855,625 | 12/1974 | Garnier et al. ............ 360/103 |
| 4,218,715 | 8/1980 | Garnier ...................... 360/103 |
| 4,420,780 | 12/1983 | Deckert ...................... 360/103 |
| 4,475,135 | 10/1984 | Warner et al. ............. 360/103 |
| 4,636,894 | 1/1987 | Mo .............................. 360/103 |
| 4,673,996 | 6/1987 | White ......................... 360/103 |
| 4,700,248 | 10/1987 | Coughlin et al. ......... 360/103 |
| 4,734,803 | 3/1988 | Nishihira .................... 360/103 |
| 4,757,402 | 7/1988 | Mo .............................. 360/103 |
| 4,870,519 | 9/1989 | White ......................... 360/103 |
| 4,961,121 | 10/1990 | Astheimer et al. ........ 360/103 |
| 5,021,906 | 6/1991 | Chang et al. .............. 360/103 |
| 5,062,017 | 10/1991 | Strom et al. ............... 360/103 |
| 5,136,445 | 8/1992 | Zak ............................. 360/103 |
| 5,196,973 | 3/1993 | Chapin et al. ............. 360/103 |
| 5,200,868 | 4/1993 | Chapin et al. ............. 360/103 |
| 5,210,666 | 5/1993 | Chapin et al. ............. 360/103 |
| 5,404,256 | 4/1995 | White ......................... 360/103 |

FOREIGN PATENT DOCUMENTS

| | | |
|---|---|---|
| 55-88234 | 7/1980 | Japan . |
| 55-93427 | 7/1980 | Japan . |
| 57-122063 | 1/1981 | Japan . |
| 57-20963 | 2/1982 | Japan . |
| 59-72679 | 4/1984 | Japan . |
| 60-101781 | 6/1985 | Japan . |
| 60-204878 | 10/1985 | Japan . |
| 63-21271 | 5/1988 | Japan . |

OTHER PUBLICATIONS

M. Ichinose, "Single-Crystal Ferrite Technology for Monolithic Disk Heads", Applied Magnetics Corporation, (Unknown).

White, James W., "Flying Characteristics of the 'Zero-Load' Slider Bearing", Trans. of the ASME, vol. 105, pp. 484–490, Jul. 1983.

(List continued on next page.)

*Primary Examiner*—Stuart S. Levy
*Assistant Examiner*—Kevin M. Watkins
*Attorney, Agent, or Firm*—Townsend and Townsend and Crew LLP

[57] ABSTRACT

The invention provides a magnetic head slider with flying height that is uniform over a recording surface and is relatively insensitive to altitude changes when used in a data storage device. In one embodiment, a slider platform carries two or more gas bearing pads in the form of TPC type pads, each having a transverse pressurization contour along at least one side edge of its face, at least one NP type pad provided with a bearing face and a recess which develops a subambient pressure level, and an ambient pressure reservoir separating each TPC type pad from each NP type pad for preventing hydrodynamic interaction between the pads. The ambient pressure reservoir defines a cavity having a depth with respect to the face of each TPC pad sufficient to maintain substantially ambient pressure in the cavity during movement of the recording medium. In another embodiment, the gas bearing pads take the form of a combination of pads with transverse pressurization contours and pads without TPC effects.

26 Claims, 13 Drawing Sheets

OTHER PUBLICATIONS

White, James W., "A Uniform Flying Height Rotary Actuated Air Bearing Slider", IEEE Trans. on Mags., vol. Mag–22, No. 5, Sep. 1986.

White, James W., "The Transverse Pressure Contour Slider: Flying Charcteristics and Comparisons with Taper–Flat and Cross–Cut Type Sliders", Adv. Info. Storage Syst., vol. 3, pp. 1–14, 1991.

News Relaese—"Applied Magnetics Corp. Announces Production of Disk Heads Incorporating TPC Air Bearing Surfaces", Applied Magnetics Corp., Sep. 1992.

White, James W., "Flying Characteristics of the 3370–type Slider on a 5¼ Inch Disk—Part 1: Static Analysis", Univ. of Tenn., 1986.

White, James W., "The Complexity of Analysis and the Challenge of Air Bearing Design at Flying Heights of Three Microinches", ASME Winter Annual Mtg., Anaheim, CA, Nov. 1992.

White, James W., "An Air Bearing Slider with Uniform Flying Height and Fast Take–Off Characteristics", Tribology and Mechanics of Magnetic Storage Systems, vol. III, pp. 95–101, 1986.

Money, J. B., "TPC Technology for Rigid Disk Drives of the 90's and Beyond", Rigid Disk Drive Components Technology Review, Singapore, Mar. 1992.

Prior Art Exhibit "A", (No Date Admission).

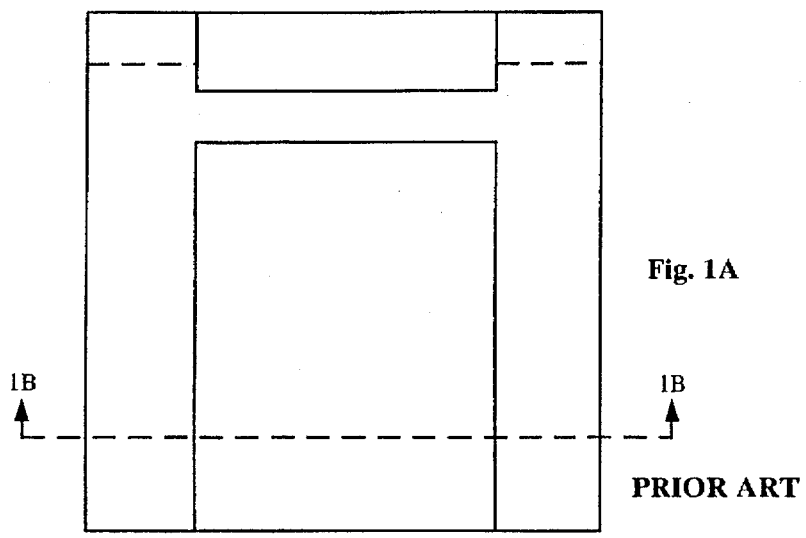
Fig. 1A
PRIOR ART
Fig. 1B
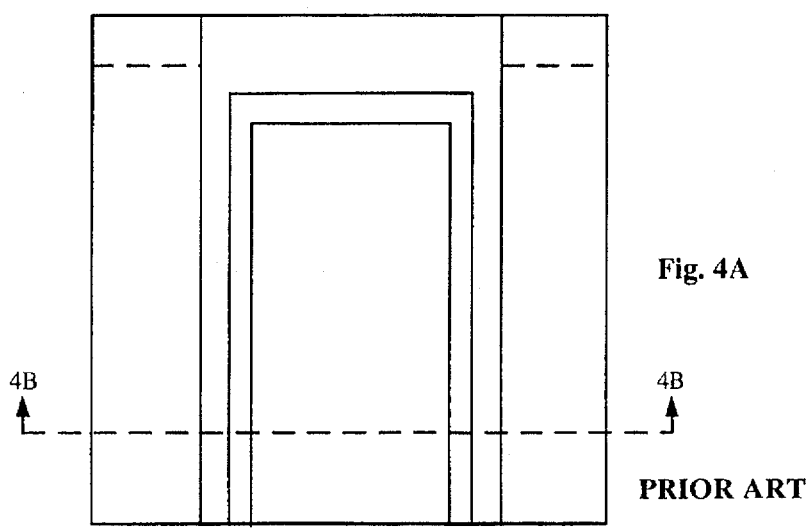
Fig. 4A
PRIOR ART
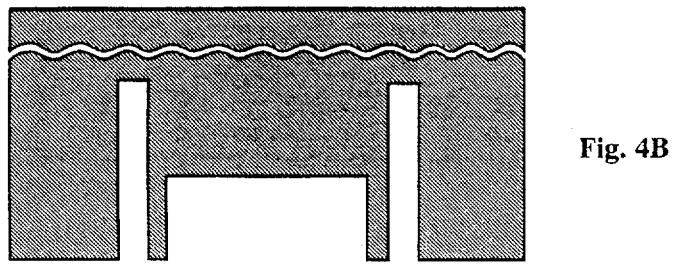
Fig. 4B

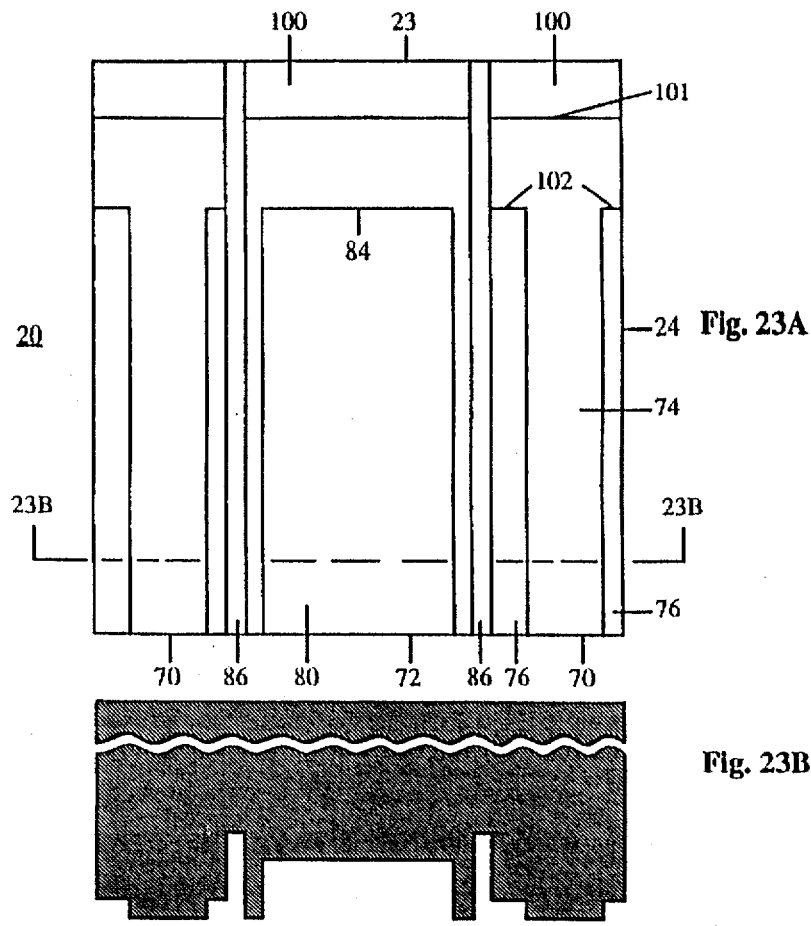
Fig. 23A
Fig. 23B
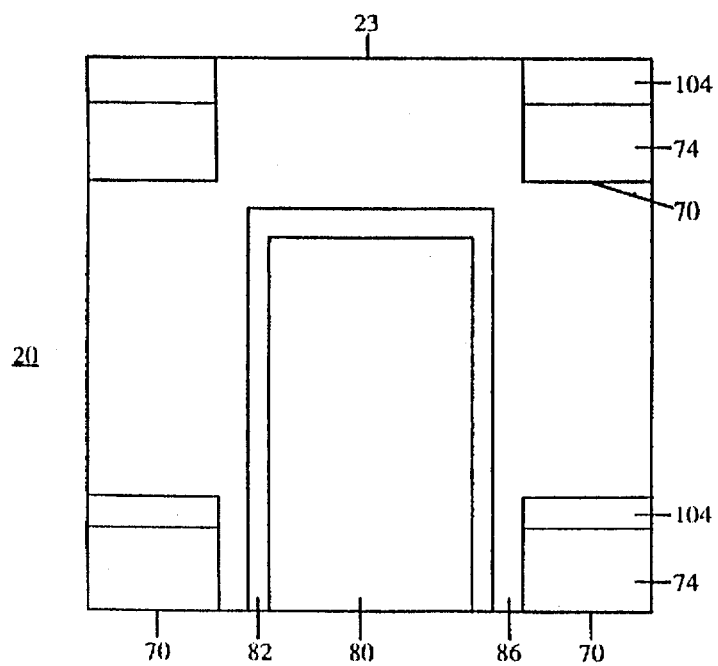
Fig. 24

METHODS FOR OPERATING A GAS BEARING SLIDER

CROSS REFERENCE TO RELATED APPLICATIONS

This application is a continuation of application Ser. No. 08/353,771 filed Dec. 9, 1994, which is a continuation-in-part application of U.S. patent application Ser. No. 07/987,508, filed Dec. 7, 1992, now U.S. Pat. No. 5,404,256, the full disclosure of which is incorporated herein by reference.

BACKGROUND OF THE INVENTION

The present invention relates generally to magnetic disk drives, and more specifically to magnetic head sliders for positioning a magnetic transducer over a hard disk surface.

The typical magnetic head slider of current hard disk drive products utilizes two or more coplanar rails or pads for the load developing surface, together with a compression inlet (such as a taper or step) on at least two of the rails for maintaining a positive pitch attitude between slider and disk surface. An external load force is applied to the slider (toward the disk). The gas film pressurization between head and disk balances the external force at some clearance between head and disk. This clearance is called the "flying height" or "fly ht." Of particular interest is the fly ht. at the magnetic recording gap which is usually located near the slider trailing edge in one of the rails. In order to maximize the amount of data stored on a disk surface, it is desired to fly at a constant fly ht. across the disk recording surface. Conventional taper-flat sliders which are currently used in most disk drive products do not fly at a constant height over the recording surface due to the air bearing characteristics of that geometry.

The trend is toward smaller, more portable applications for data storage products. This results in smaller disk drives. The recording head is typically positioned over the recording area of the disk by a rotary actuator. The varying angular orientation of the slider longitudinal axis relative to the disk motion due to the rotary actuator causes the fly ht. and slider roll angle to vary over the recording surface. This angular orientation is referred to as the "skew angle." The skew angle is typically defined to be negative when the slider leading edge is rotated out, away from the disk center. Most disk drives operate in such a way that the sliders start and stop in contact with the disk surface. The relative motion between slider and disk at start-up produces the self-acting gas bearing effect which causes the slider to lift-off and proceed to the fully flying orientation. Intermittent contact occurs between slider and disk as rotation starts until a stable gas bearing is developed. The amount of contact and wear that occurs between slider and disk during rotational start-up depends on the magnitude of load force and how rapidly the gas bearing is developed.

The slider load force that is used in most disk drive products today varies between about 3 and 7 grams. There is, however, a trend toward lower load forces. The increased data densities of new products require a thinner magnetic layer on the disk surface as well as a thinner protective overcoat on top of the magnetic layer. In order to minimize the wear that occurs at the slider/disk interface, there is an increased emphasis on decreasing the average contact pressure between slider and disk. The average gas film pressure may be given by $P=F/A$, where "F" is the externally applied force and "A" is the total gas bearing surface area of the slider. It is seen that the external force may be decreased and/or the slider gas bearing surface area can be increased in order to decrease the average gas film pressure. Note that this average gas film pressure is also the average contact pressure when the disk is stationary, assuming the entire slider gas bearing surface area is in contact.

As recording densities increase, the gas bearing fly ht. decreases. Current high performance products fly at about 2 microinches and the general trend is toward ever lower values of flying height. In order to develop lower fly ht., the slider rail width or pad width is typically decreased (with the external force held constant). This results in a decreased gas bearing surface area. Another approach is to increase the external force while keeping the slider rail width constant. Note that both of these approaches produce an increase in both the average gas film pressure and the average contact pressure between slider and disk. A list of desirable slider air bearing characteristics for the head/disk interface of near-term hard disk drives is given below:

(1) Low, constant fly ht. over the data band, with very little slider roll
(2) Low slider load force (for decreased wear)
(3) Rapid slider take-off during rotational start-up
(4) High gas bearing stiffness (for increased flying height stability and control)
(5) High gas bearing damping (for increased stability and minimum settling time after access motion)
(6) Acceptable flying characteristics with large skew angle variations over the data band (Large skew angle variations are important in order to increase the width of the data band for increased storage, or to decrease the rotary arm size and inertia for decreased energy requirements during access motion).
(7) Reduced sensitivity of fly height to altitude change.

Different slider geometry types have different gas bearing characteristics. The taper-flat (TF) type slider utilizes 2 or more rails for developing a positive load. The fly ht. of the TF slider is quite sensitive to the skew angles produced by a rotary actuator. This type slider is relatively simple to manufacture and is utilized in most disk drive products today. The TF slider is described in U.S. Pat. No. 3,823,416 to Warner, the complete disclosure of which is incorporated herein by reference.

A negative pressure (NP) type slider utilizes the positive load developed by longitudinal rails and the negative (subambient) load developed by a recess to provide a net low load. This results in the low net load (adjustable to any value), high gas bearing stiffness, and rapid slider take-off. The conventional NP slider has poor damping characteristics, and provides a flying height and roll angle that is sensitive to skew angle.

In our U.S. Pat. No. 3,855,625 ('625), the complete disclosure of which is incorporated herein by reference, an NP slider, illustrated in FIGS. 1A and 1B is disclosed. The intended application was with a zero skew angle (linear actuator). In such a case, the changing disk velocity with radius has an influence on the positive load developed by the rails which is about in the same proportion to that for the negative load produced by the recess. This results in a near constant flying height over the data band when the skew angle is maintained at near zero. Pressure profiles over the NP slider at zero skew are shown in FIG. 2 and are seen to be nearly symmetric about the slider longitudinal centerline. (These and other pressure profiles which will be described later are based on simulations done with a computer code named BOLTZMANN1, which I authored. In these figures, curves A–F represent pressure levels in the transverse direction at various distances from the leading edge of the slider, with curve A at 9% of the slider length, curve B at 36% of the slider length, curve C at 40% of the slider length, curve D at 58% of the slider length, curve E at 76% of the slider length and curve F at 94% of the slider length from the leading edge. These simulations were made on a "70%" size slider which flies on an air film over a 3.5 inch disk spinning at 5400 rpm.)

When this NP slider is used with a rotary actuator, however, the skew motion across the slider causes the low subambient pressure of the recess in a conventional NP slider to be convected over the positive pressure rails. This causes extreme pressure distortion over the rails and causes the slider fly ht. and roll angle to vary unacceptably over the data band. Pressure profiles for the NP slider are shown in FIG. 3 for the case of +10° skew. In this case, the transverse motion due to skew is from right to left on the figure. It may be noted that the subambient pressure of the recess is convected over the left side pad. Other NP type sliders are described in U.S. Pat. No. 4,218,715; U.S. Pat. No. 4,475,135; U.S. Pat. No. 4,420,780 and U.S. Pat. No. 5,062,017, which are incorporated herein by reference. Sliders of each of these patents suffer from flying height sensitivity to skew angle.

Since the NP slider depends on a combination of positive and negative load to provide the net low positive load, the positive pads are wider than those of a conventional TF slider. The increased stiffness of the NP slider is achieved by the larger positive load of the longitudinal rails. The subambient load of the recess has little influence on the overall slider gas bearing stiffness. The increased stiffness of the NP slider contributes to a faster take-off during start-up, and the low net load and wider pads produce a reduced average gas film and contact pressure.

The side boundaries of the recess of the NP slider in our '625 patent are formed by the side edges of the outside rails. In U.S. Pat. No. 4,636,894 ('894), which is incorporated herein by reference, Mo describes the possible problem of controlling the side boundaries of the recess (and thus, the rail width) when using an etching process to form the recess. In '894 (see FIGS. 4A and 4B), Mo suggests the use of a groove and buffer pad to separate the side edges of the recess and rails so as to reduce the sensitivity of the resulting rail widths to the etching process used. The resulting NP slider of the '894 patent has a large flying height sensitivity to skew angle which is similar to that of the TF slider. This flying height sensitivity to skew angle of the '894 patent NP slider is caused by pressure distortion and dilution over the outer rails as flow enters the gas bearing across the rail side edges. Flying height profiles for an NP slider possessing the '894 patent configuration are given in FIG. 5. Two skew distributions, (−10°, +10°) and (0, +10°), are presented. In both cases, there is a wide variation of flying height over the recording zone of the disk.

A further slider type is the TPC slider described in my U.S. Pat. Nos. 4,673,996 ('996) and 4,870,519 ('519), which are incorporated herein by reference. Each slider rail utilizes a transverse pressure contour (TPC) on at least one side edge. The result is that the gas bearing effect of the changing velocity over the data band is almost exactly offset by that of the changing skew angle, producing a constant flying height and nearly zero roll angle.

A combination TPC/NP type slider was also described in '996 and '519, illustrated in FIGS. 6A and 6B. In both TPC patents, the negative pressure recess side boundaries were formed by the slider outer rails and the rails were connected by a cross bar. An objective of the present invention is to provide a new combination low load TPC/NP type slider with even more rapid take-off and with the ability to negotiate even wider skew angle variations with constant flying height.

A further objective of the invention is to provide a slider assembly capable of exhibiting a decreased fly height sensitivity to altitude changes. Altitude effects are described in greater detail in a later section.

SUMMARY OF THE INVENTION

The invention in one embodiment provides a transverse and negative pressure contour (TNP) slider which combines the features of an NP slider with a TPC slider in such a way as to achieve substantially constant flying height over a wide range of skew angles and very fast take-off with a decreased sensitivity of fly height to changes of altitude.

In a preferred embodiment, the invention provides a slider assembly comprising a support structure which carries at least two TPC type pads, each having a transverse pressurization contour along at least one side edge of its face, at least one NP type pad provided with an air bearing face and a recess which develops a subambient pressure level, and an ambient pressure reservoir separating each TPC type pad from each NP type pad for preventing hydrodynamic interaction between the pads. The ambient pressure reservoir defines a cavity having a depth with respect to the face of each TPC pad sufficient to maintain substantially ambient pressure in the cavity during movement of the recording medium. Usually, the ambient pressure reservoir will have a non-tapered leading edge.

The TPC type pads will define a face toward the recording medium and a converging inlet at the leading edge for pressurizing gas between the face and the recording medium. The transverse pressure contour (TPC) will be disposed along at least one side edge of the face, and in an exemplary embodiment, will be disposed along both side edges of the face. The faces of the TPC type pads are not necessarily rectangular in shape. In the transverse direction, the TPC geometry may be a step, taper, or convex shape. Regardless of the shape, at each location along the side edge which contains the TPC, an average angle may be defined by $$\theta = \tan^{-1}\left(\frac{\text{depth}}{\text{width}}\right) < 5.°$$

where
depth=the total depth of the TPC at the given location
width=the width of the TPC at the given location
The width of the TPC is not necessarily constant, but may vary along the side edge. The side edges of the faces may be non-parallel, and, for example, may diverge from one another from the leading edge toward the trailing edge. The TPC may extend the full length of the side edge on which it is located, or along only a selected portion thereof.

The recess in the NP type pad will usually be open at its trig edge. The NP type pad is not necessarily rectangular. The recess depth is preferably less than 25 microns, so as to develop a subambient pressure level that serves to attract the slider assembly toward the recording medium during movement thereof. The side edges of the NP type pad may or may not contain TPC sections for additional flying height control.

The TPC type pads and NP type pads may be arranged in a variety of configurations on the support structure. In an exemplary embodiment, two TPC type pads are provided along each side of the support structure extending from the leading edge to the trailing edge. In a further embodiment, a TPC type pad is disposed at each leading edge corner of the support structure, and a third TPC type pad is disposed along the trailing edge, usually near the center, of the support structure. In another embodiment, a TPC type pad is located at both trailing edge corners. A relatively flat pad may further be provided for housing the magnetic transducer, which, in an exemplary embodiment, is disposed centrally along the trailing edge of the support structure.

Further alternative embodiments are provided for reducing sensitivity of the slider assembly to altitude. These embodiments employ a support structure and at least one NP type pad. Other gas bearing pads are provided on the support structure in various arrangements to reduce the sensitivity of the slider to altitude. In each of these embodiments, the gas bearing pads are separated from the NP type pad by an ambient pressure reservoir which prevents hydrodynamic interaction between the pads. In one embodiment, at least two gas bearing pads are carried by the support structure, with at least one of the gas bearing pads being a TPC type pad, and with at least one of the gas bearing pads being provided with a converging inlet at a leading edge of the pad. In another embodiment, at least one gas bearing pad is disposed along the support structure near the leading edge and extends backward along the support structure for only a portion of the length of the support structure. At least one gas bearing pad is disposed along the support structure near the trailing edge and extends forward for only a portion of the length of the support structure. Each gas bearing pad defines a face toward the recording medium, and at least one of the gas bearing pads is provided with a converging inlet at a leading edge of the pad for pressurizing gas between the face and the recording medium. In a further embodiment, two gas bearing pads are carried by the support structure. The gas bearing pads have a length that is substantially equal to the length of the support structure. At least one of the gas bearing pads is a TPC type pad, and both of the gas bearing pads are provided with a converging inlet at a leading edge of the pads.

A further understanding of the nature and advantages of the invention may be realized by reference to the remaining portions of the specification and the drawings.

BRIEF DESCRIPTION OF THE DRAWINGS

FIGS. 1A and 1B are top and front elevational views, respectively, of a NP slider according to the prior art.

FIGS. 4A and 4B are top and front elevational views, respectively, of another NP slider according to the prior art.

FIGS. 23A and 23B are top and front elevational views, respectively, of a further embodiment of a TNP slider constructed in accordance with the principles of the present invention.

FIG. 24 is a top elevational view of another embodiment of a TNP slider constructed in accordance with the principles of the present invention.

DESCRIPTION OF SPECIFIC EMBODIMENTS

The composite TPC/NP slider, hereafter referred to as the TNP (Transverse and Negative Pressure contour) slider, is defined by a combination of "TPC type" gas bearing pads or rails and at least one "NP type" pad situated on a magnetic head slider platform. Each of the pads or rails is separated from the others by an ambient pressure reservoir. The ambient pressure reservoir is composed of a relatively thick gas film which is continually fed with ambient pressure gas by the convection due to relative motion between slider and disk. The ambient pressure reservoir completely borders each pad and prevents direct hydrodynamic interaction between any of the pads. That is, hydrodynamic pressure generated over one pad cannot be convected over any other pad. This tends to minimize pressure distortion over the slider and contributes to flying height control.

Figure 7A:
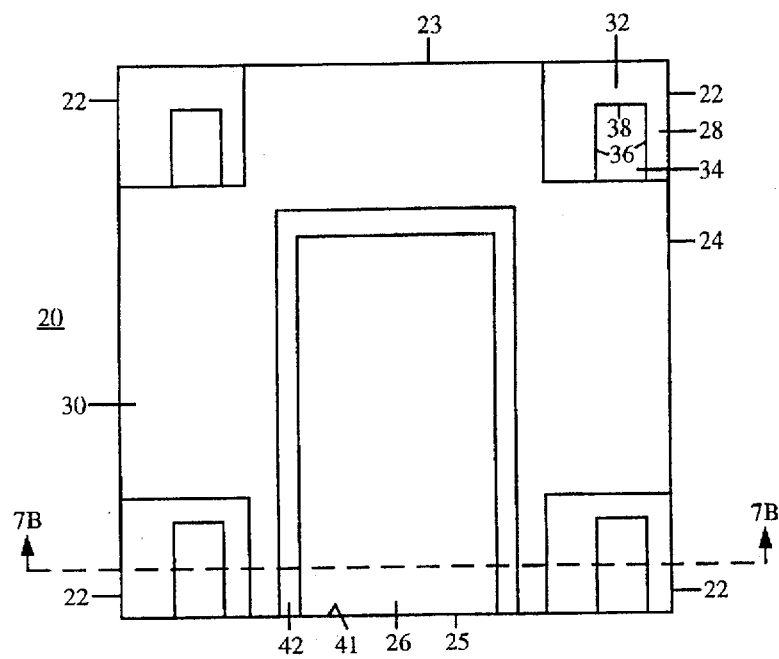
FIGS. 7A and 7B are top and front elevational views, respectively, of a specific embodiment of a TNP slider constructed in accordance with the principles of the present invention.
Figure 7B:
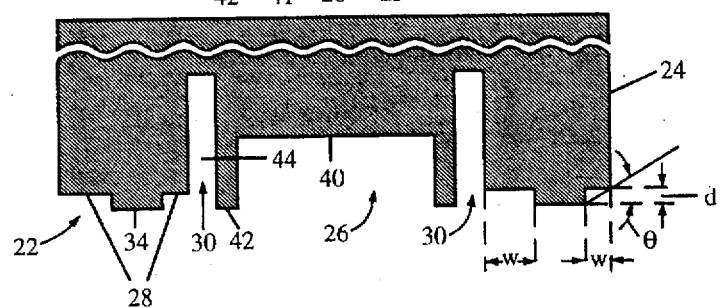

One version of the TNP slider 20 is shown in FIGS. 7A and 7B. In this example, there are four TPC pads 22, one at each of the corners of the slider platform 24, and one central NP pad 26. Slider platform 24 has a leading edge 23 and a trailing edge 25. The four TPC pads tend to maximize the gas bearing pitch and roll stiffness. In addition, they tend to allow (because of their less slender width to length ratio as compared to full slider length rails) a wider range of skew angle variations while maintaining a constant flying height and near zero roll angle. This increased flying height control is due in part to the fact that with the relatively wider TPC pads, the varying skew angle has less influence on the air bearing pressure generated. The compression inlet of each TPC pad includes a converging portion at a leading edge, shown as a stepped surface in FIG. 7A. Each TPC pad could also function in an equivalent manner with a tapered inlet or with a convex shaped inlet. The same is true of other embodiments of the TNP slider described herein.

Increased flying height control also results from the fact that the TPC contours 28 are multi-function load generators (compression or expansion), depending on the skew angle magnitude and direction. For a given disk size and skew angle distribution, the TPC width and depth parameters may be sized to provide the precise amount of lift or vacuum effect required as radial location and skew angle varies, in order to produce the desired flying height profile. The presence of compression inlets on the two trailing pads (as well as the two leading edge pads) causes the full slider length to be lifted when disk rotation starts. This causes the full slider length to establish a non-contact flying attitude at a lower disk velocity than a full rail length TF or TPC type slider.

The NP pad 26 produces a negative lift to the slider and allows the net slider load to be specified at a low value. This results in the TPC pads being over-sized and producing more positive lifting force than for the case without the NP pad. When the TNP slider starts in contact with the disk, the first disk motion generates hydrodynamic pressure effects primarily on the TPC pads, because the load carrying surface of the NP pad is considerably elevated from the disk surface. The gas bearing load generated at low disk velocity over the four oversized TPC pads causes the slider to separate quickly from the disk surface. The vacuum effects produced by the NP pad develop at higher velocities after the slider is flying.

The ambient pressure reservoir 30 serves to isolate the load generating effects of the various parts. The reason for this becomes clear when considering the combined TPC/NP type slider described in my '996 and '519 patents. In that case, the side boundaries of the NP pad are formed by the TPC rails. When a large skew angle is utilized, the low pressure of the recess is convected over one of the rails, causing pressure distortion over that rail. This results in some flying height and roll angle sensitivity to skew. In the present invention, the ambient pressure reservoir 30 prevents direct hydrodynamic interaction between the various load generating pads. Larger skew angles than are possible with the conventional TPC and TPC/NP sliders are possible with the new TNP slider. This is due to the use of reduced slenderness ratio oversized TPC pads, and to the load reducing effect of the NP pad 26. Diagonal convection produced by skew cannot penetrate as far into the oversized pads. A quicker slider take-off is due to compression inlets 32 on all four TPC pads and to the oversized (stiffer) TPC pads 22 made possible by the NP pad 26. Thus, each gas bearing pad plays a key role in providing for a faster take-off from the disk surface and in allowing a wider range of skew angles.

In the embodiment of FIGS. 7A and 7B, each TPC pad 22 is defined by a face 34 for creating a gas bearing effect, a TPC section 28 comprising a constant depth step bearing along the side edges 36 of the face 34 and a constant depth step along the leading edge 38 forming a converging compression inlet 32. Thus, the gas bearing contour of the TPC pad 22 is defined by two parallel planes With a slight off-set. The faces 34 and TPC sections 28 of TPC pads 22 may or may not be rectangular. The TPC edge contours 28 may or may not run the full length of the TPC pad 22, and the width of the TPC sections 28 may vary along the pad length for increased flying height control. The TPC sections 28 and compression inlet 32 of the TPC pad 22 may be defined by either step, taper, or convex geometries, or by combinations of these geometries. The edge contours 28 of the TPC pad 22 and compression inlet are such that the average angle θ, defined by the depth d of the TPC 28 or compression inlet 32 and the width w of the TPC 28 or compression inlet 32, is given by $$\theta = \tan^{-1}\left(\frac{depth}{width}\right) < 5.°$$

The NP pad 26 is defined by a substantially plane surface which contains a recess 40 open at the trailing end 25. The NP pad 26 may further include one or more bearing faces 42 at a height approximately that of the faces 34 of the TPC pads 22 for creating a gas bearing effect. Recess 40 will be open along its trailing edge 41; that is, trailing edge 41 will have a configuration and height relative to ambient pressure reservoir 30 such that the pressure along trailing edge 41 is substantially ambient. Thus, bearing face 42 will not extend across trailing edge 41 of the NP pad. The recess 40 of the NP pad 26 will preferably have a depth of less than about 25 microns relative to the bearing faces 42 so as to generate subambient pressure in response to movement of the disk relative to the slider. The NP pad 26 may or may not be rectangular in shape. The plane of the NP pad may be positioned at another conveniently produced height such as that of the TPC sections 28. The NP pad may also contain a contoured leading edge for generating a compression effect or may contain a partially recessed section immediately upstream of the recess 40 so as to provide a further parameter for control of the subambient pressure level produced in the recess 40.

The ambient pressure reservoir 30 will define a cavity 44 having a depth and configuration sufficient to maintain substantially ambient pressure in the cavity during movement of the disk. This depth will preferably be at least about two microns relative to the faces 34 of the TPC pad 22. A convenient depth for the ambient pressure reservoir is that of the NP recess since this will allow both the recess and the ambient pressure reservoir to be created with a single etch or ion mill step. Further, ambient pressure reservoir 30 will in most cases have a non-tapered (non-stepped, non-convex) inlet along leading edge 23 so as to inhibit generation of gas bearing effects created by compression of inlet gas. In most cases, the ambient pressure reservoir will have a substantially constant depth throughout cavity 44 from leading edge 23 to trailing edge 25. The ambient pressure reservoir is continually replenished with ambient pressure gas due to the viscous convection caused by disk rotation.

In some applications, it may be desirable to utilize a slider 20 without TPC contours 28 on some or all of TPC pads 22. In such a case, faces 34 would occupy the entirety of TPC pads 22, with side edges 36 bordering ambient pressure reservoir 30. Compression inlet 32 would remain at leading edge 38 of each pad to provide compression of gas between faces 34 and the disk.

Figure 8:
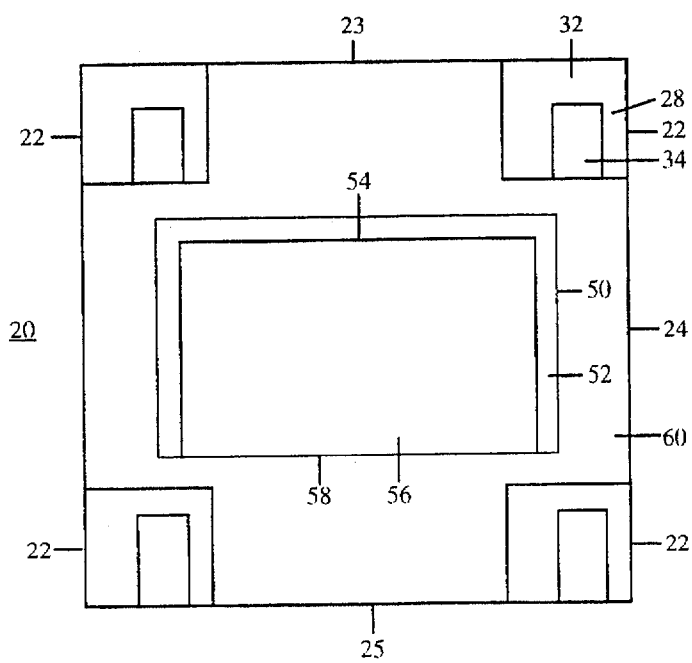
FIGS. 8–10 are top elevational views of further specific embodiments of a TNP slider constructed in accordance with the principles of the present invention.

Other configurations of the TNP slider 20 are possible. A further exemplary embodiment is presented in FIG. 8, and includes an NP pad 50 that does not extend to the slider trailing edge 25. Bearing face 52 surrounds only the leading edge 54 and two sides of NP pad 50. Recess 56 is bounded at its trailing edge 58 by ambient pressure reservoir 60. This arrangement reduces the width of the gas bearing surface at the slider trailing edge which is exposed to the minimum fly ht. Thus, this arrangement reduces the exposure to intermittent contact between slider and disk.

Figure 9:
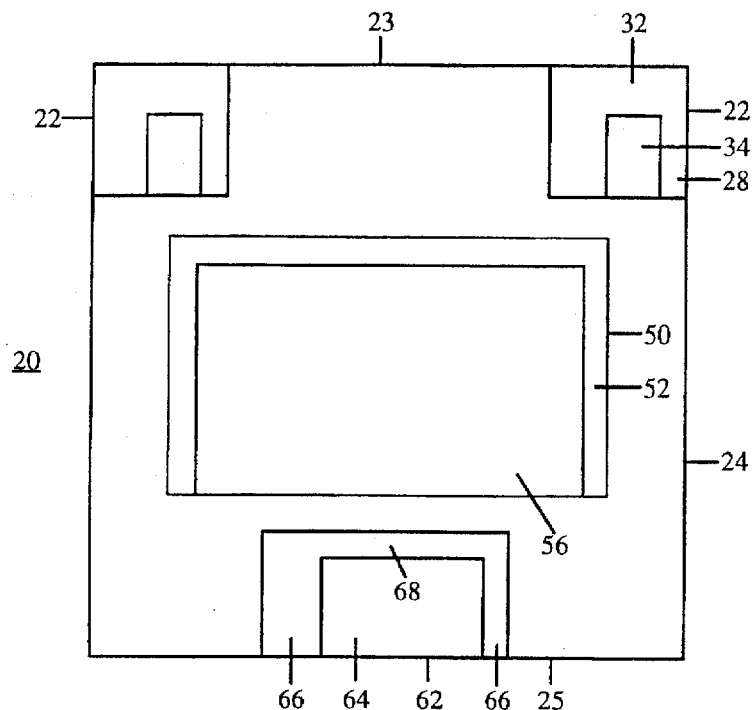

FIG. 9 illustrates a slider with a single centered TPC pad 62 along trailing edge 25 of slider 20. TPC pad 62 defines a face 64 with TPC contours 66 and leading edge compression inlet 68. The motivation here is that the gap (transducer) located in the trailing pad 62 will have a fly hi. that is less sensitive to tolerances that cause the slider 20 to roll.

Figure 10:
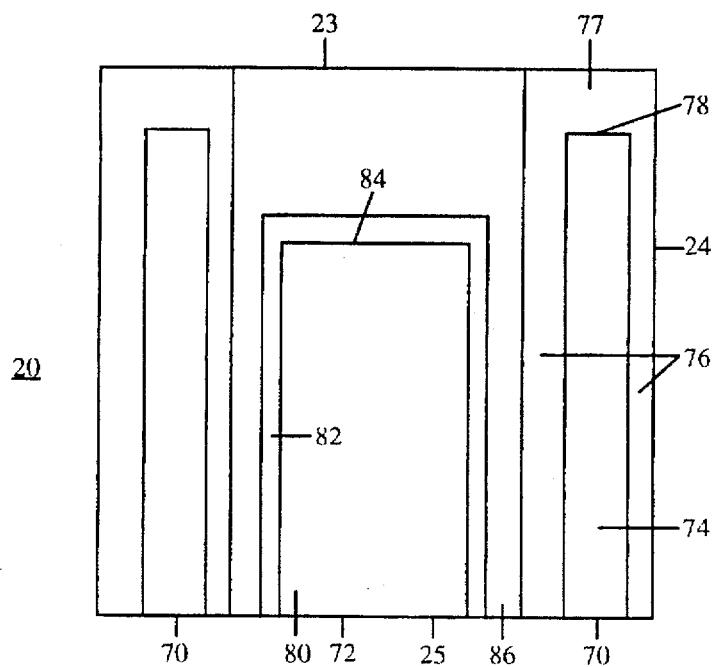

FIG. 10 illustrates a slider geometry that utilizes two full length TPC rails 70 along opposing sides of the slider platform 24 and a central NP pad 72 between the TPC rails 70. TPC rails 70 each define a face 74 having TPC contours 76 along its side edges and compression inlet 77 along its leading edge 78. NP pad 72 defines a recess 80 open along trailing edge 25 and surrounded by a bearing face 82 along both sides and leading edge 84. Ambient pressure reservoir 86 separates rails 70 from NP pad 72.

Figure 11:
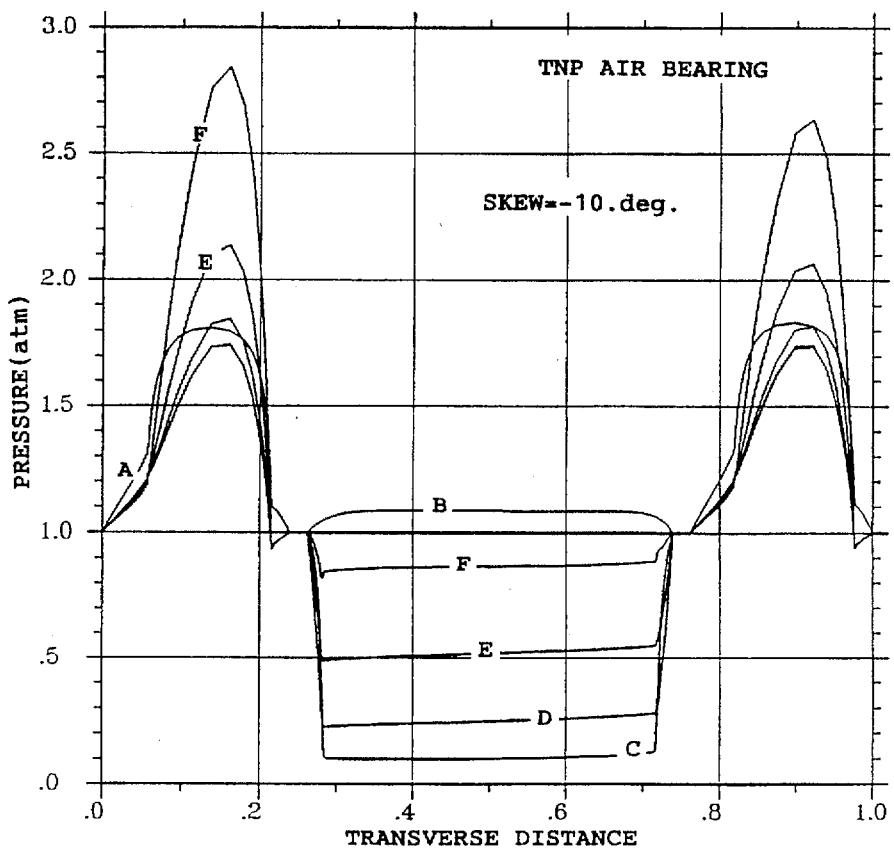
FIGS. 11–13 are graphs of gas pressure as a function of transverse position on the TNP slider of FIG. 10 for skew angles of –10°, 0 and +10°, respectively.
Figure 6A:
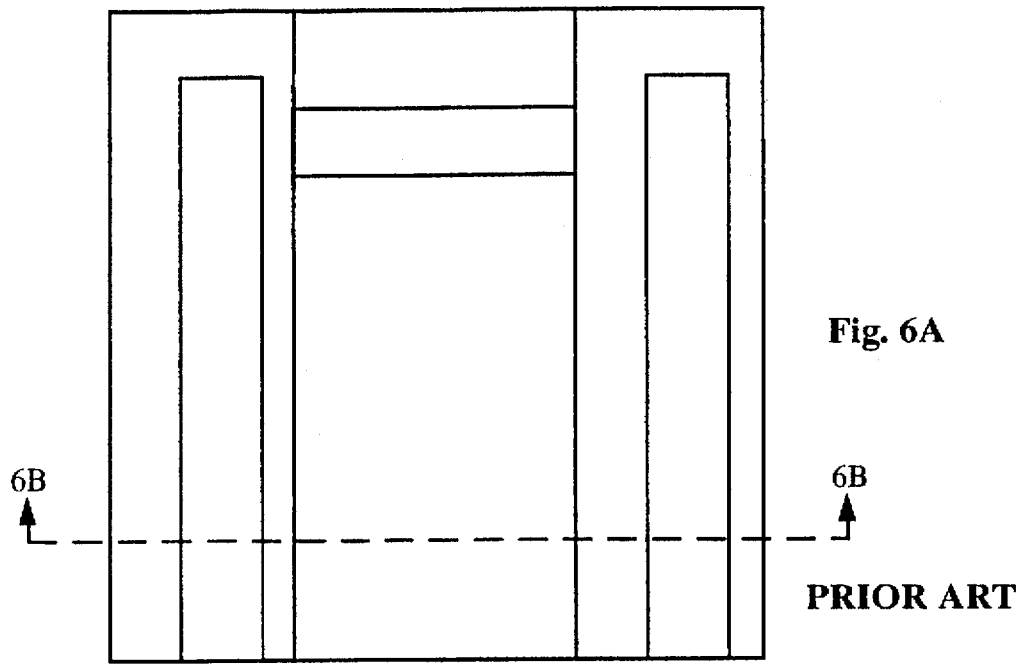
FIGS. 6A and 6B are top and front elevational views, respectively, of a TPC slider having an NP recess according to the prior art.
Figure 6B:
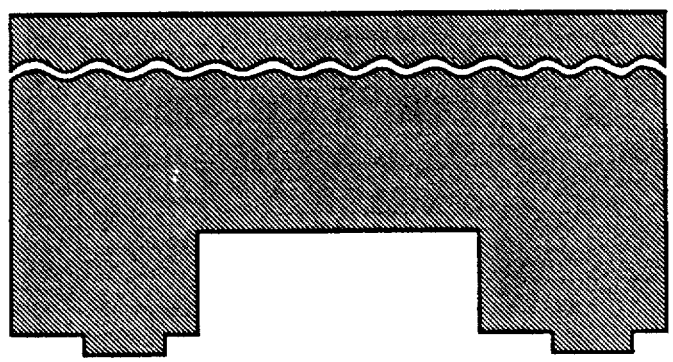
Figure 12:
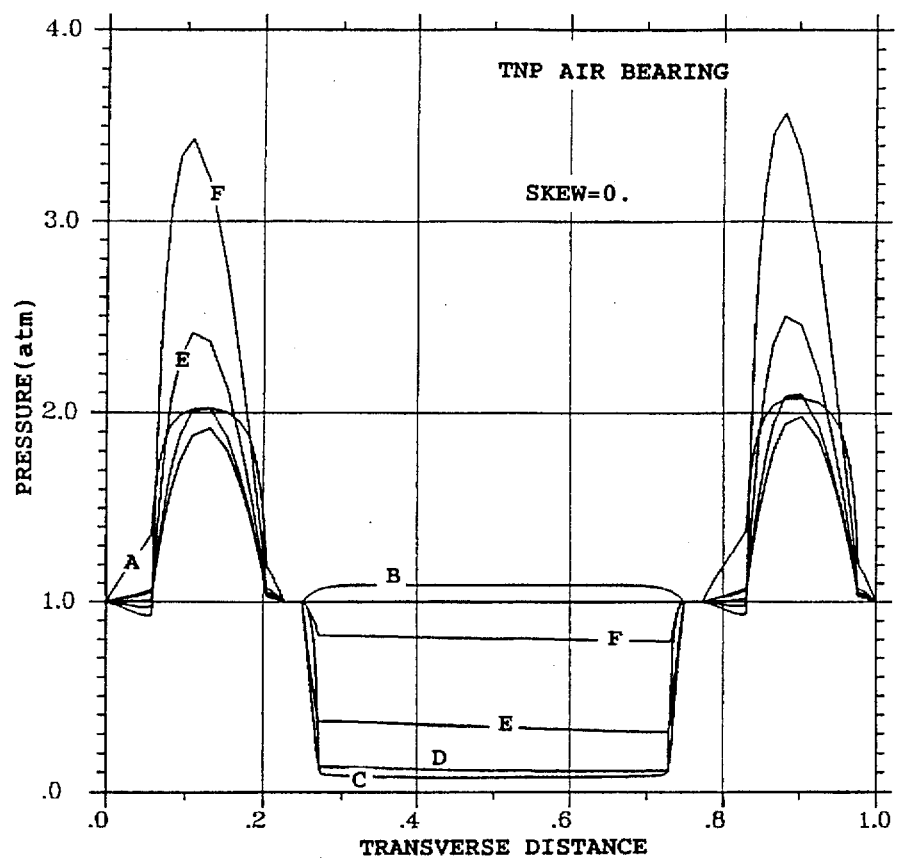
Figure 13:
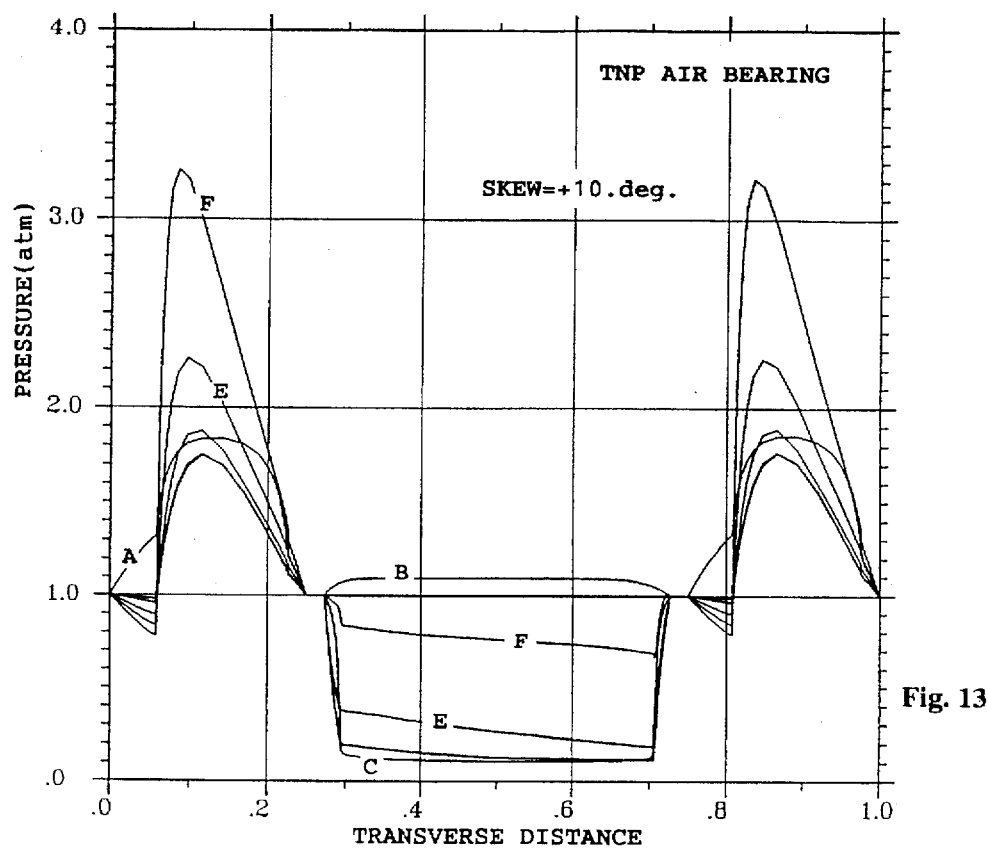

Pressure profiles corresponding to the slider type shown in FIG. 10 are presented on FIGS. 11–13, for skew angles of −10° (transverse motion from left to right), zero skew, and +10° (transverse motion from right to left), respectively. As described above, in these figures, curves A–F represent pressure levels in the transverse direction at various distances from the leading edge 23 of slider 20, with curve A at 9% of the slider length, curve B at 36% of the slider length, curve C at 40% of the slider length, curve D at 58% of the slider length, curve E at 76% of the slider length and curve F at 94% of the slider length from leading edge 23. In the embodiment of FIG. 10, curve A corresponds to the location of leading edge 78 of face 74 on TPC rails 70 where compression inlet 77 meets face 74. Curve C corresponds to the location of the leading edge of the recess 80. For purposes of reference, leading edge portion 84 of bearing face 82 of NP pad 72 lies at 27% of the length of slider 20 from leading edge 23. It should be noted that there is a relative lack of pressure distortion due to skew.

Figure 2:
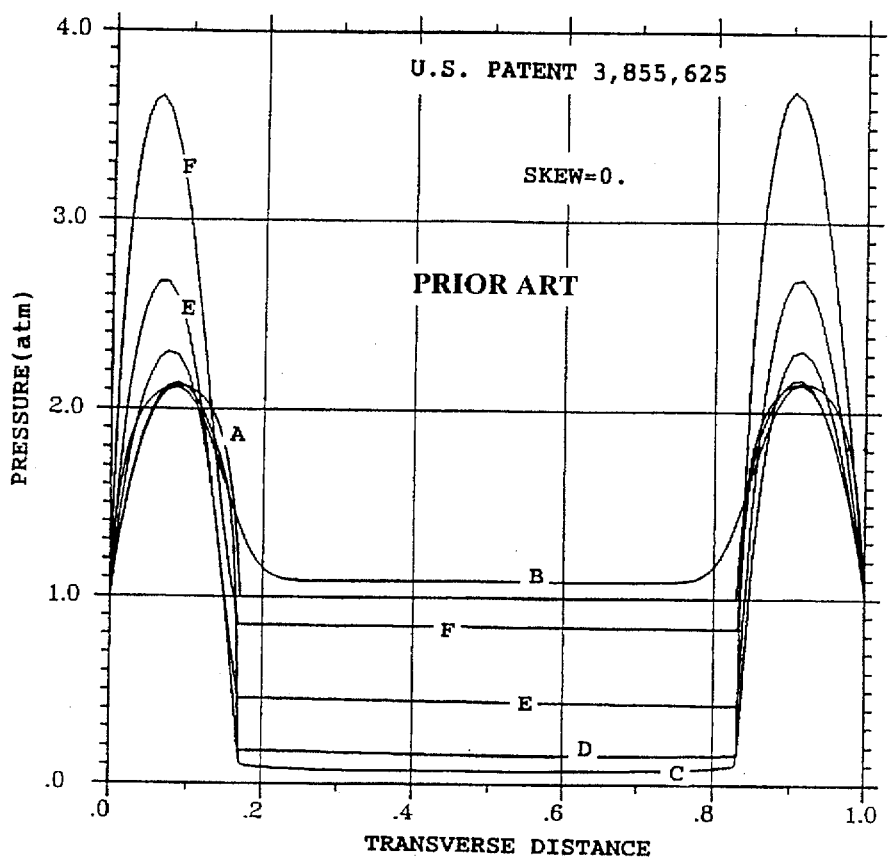
FIG. 2 is a graph of gas pressure as a function of position along the NP slider of FIGS. 1A and 1B at a zero skew angle.
Figure 3:
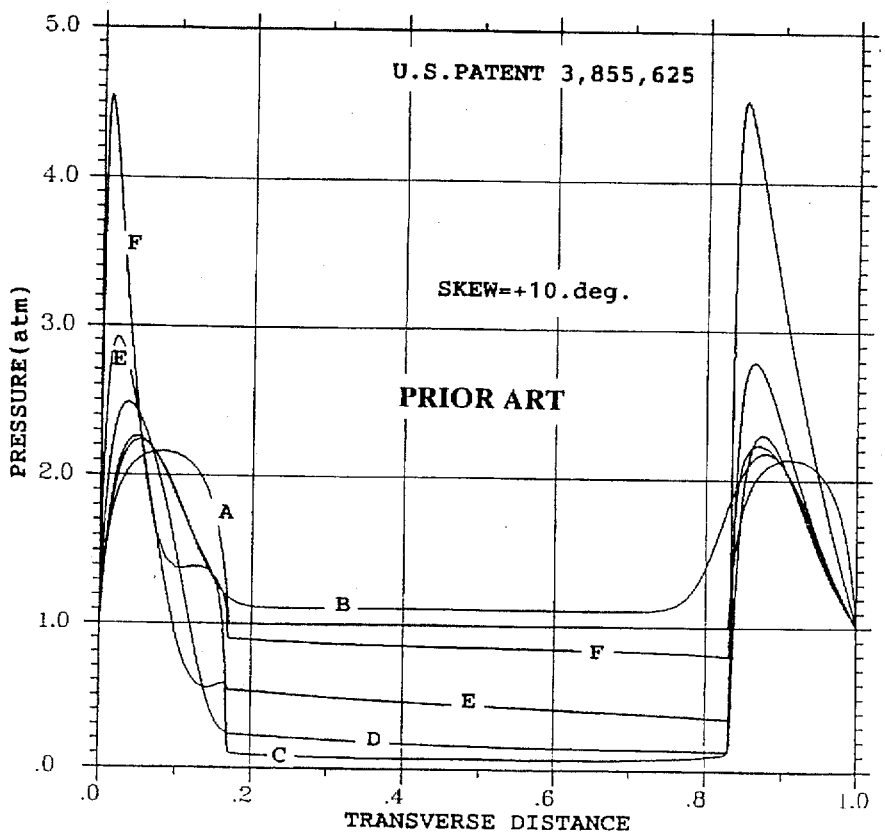
FIG. 3 is a graph of pressure as a function of position along the NP slider of FIGS. 1A and 1B at a skew angle of +10°.
Figure 5:
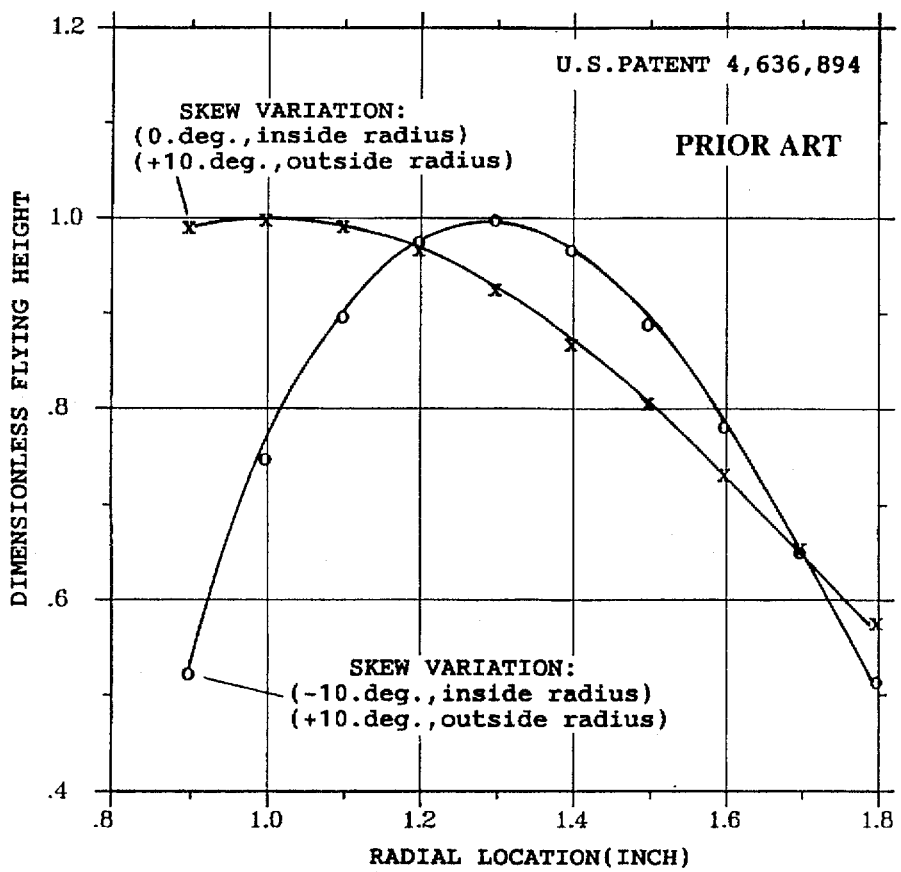
FIG. 5 is a graph of flying height as a function of radial location on the recording medium for the NP slider of FIGS. 4A and 4B.
Figure 14:
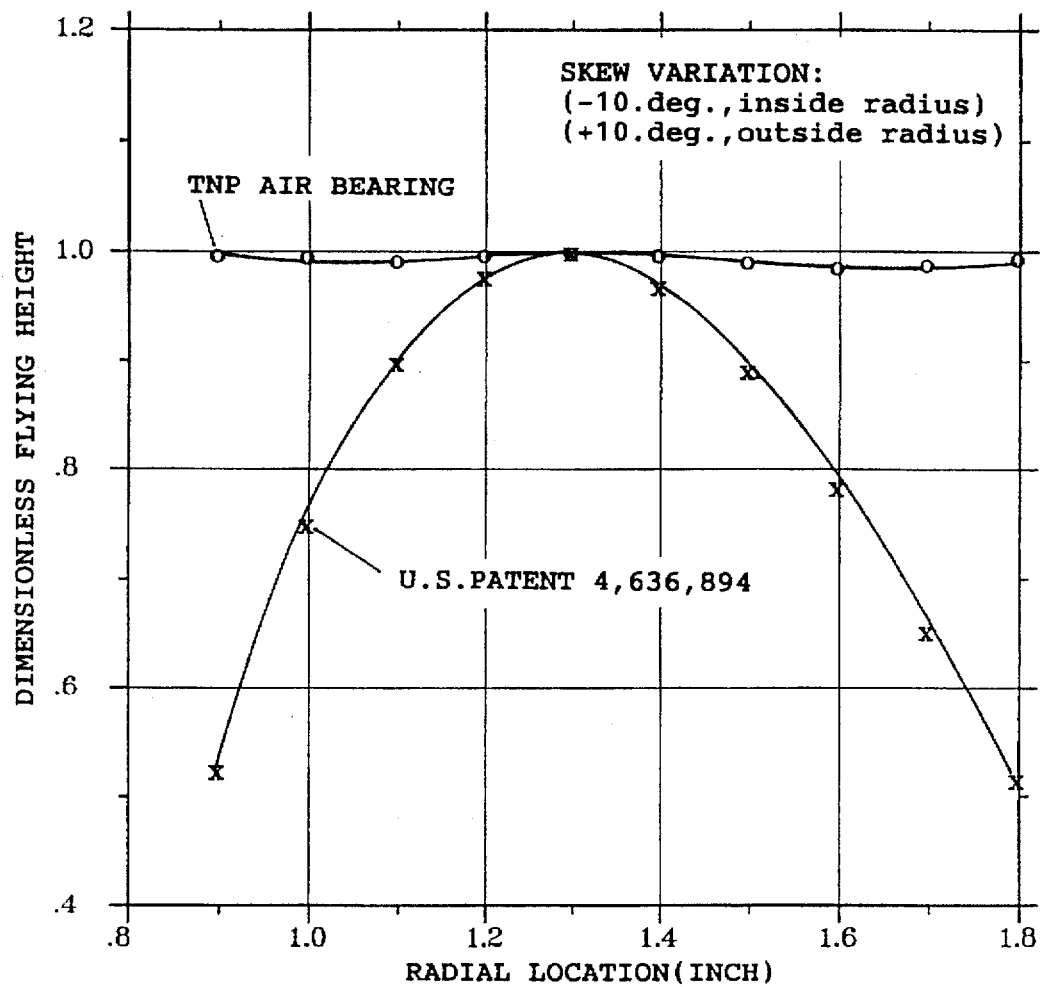
FIG. 14 is a graph of flying height as a function of radial position on the recording medium for the TNP slider of FIG. 10 as compared with the NP slider of FIGS. 4A and 4B.

The flying height profile for a TNP slider 20 of the geometry in FIG. 10 is presented in FIG. 14. The slider geometry is based on a 70% scale slider and the disk speed is 5400 rpm. In this example, the TPC sections 28 have a step depth of 25 μ-inch and the NP pad recess is 150μ-inch deep. The flying height shown on FIG. 14 for the TNP slider is due to a skew angle variation of from −10° at the inside data track to +10° at the outside radius data track. The flying height of the TNP slider is seen to be nearly constant over the radial recording band. Also shown for comparison is the flying height profile for the slider of the '894 patent illustrated in FIGS. 4A–4B and graphically presented in FIG. 5. Both slider configurations are subject to the same skew angle distributions. While the flying height of the slider of the '894 patent varies widely over the data band, the flying height of the TNP slider varies by only 0.1μ-inch.

Figure 15:
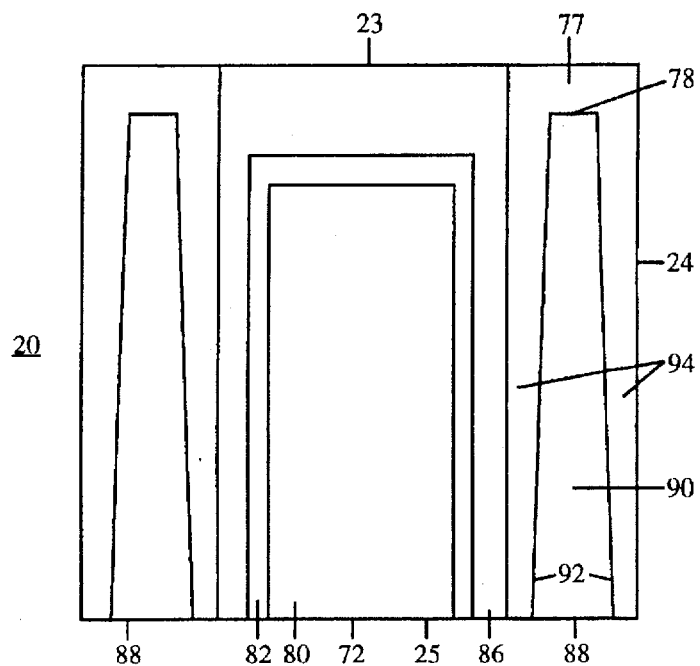
FIGS. 15–18 are top elevational views of further embodiments of a TNP slider constructed in accordance with the principles of the present invention.
Figure 16:
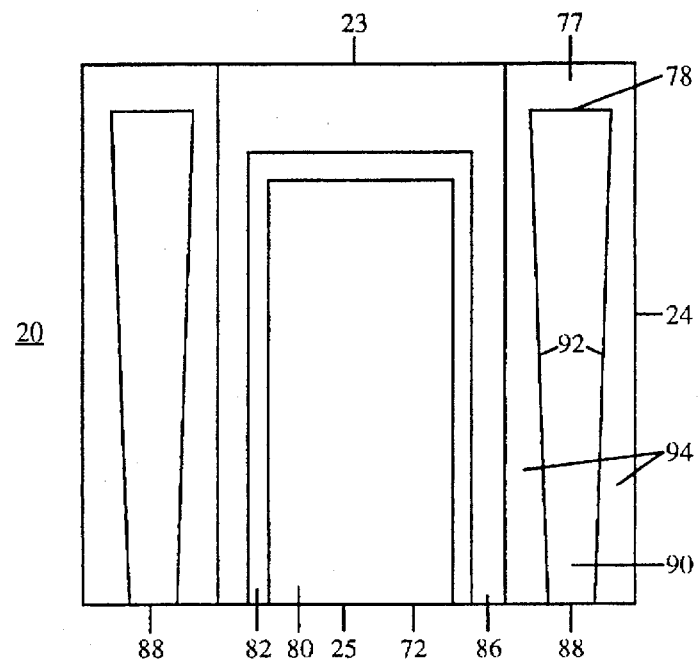
Figure 17:
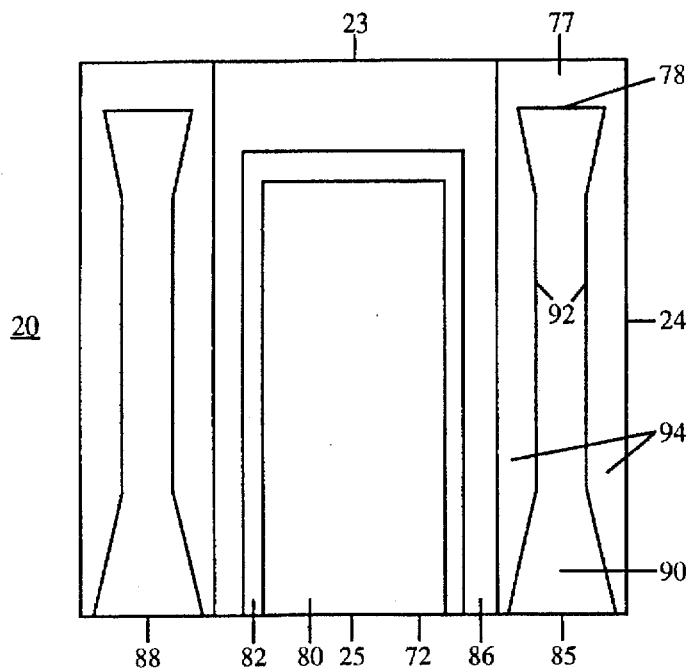

Additional geometric parameters with which to control slider take-off and flying height performance may be provided by varying either the width of the TPC contours, the width of the face, or both, in the longitudinal direction. As an example, a variation of the slider shown in FIG. 10 is presented in FIG. 15. In this embodiment, TPC rails 88 define a face 90 having non-parallel side edges 92 which diverge as the trailing edge 25 is approached. Thus TPC contours 94 have a width which decreases from leading edge 23 to trailing edge 25. In this embodiment, the increased face width at the trailing edge contributes to ease of implementation of the magnetic transducer and to increased speed of take-off of the slider from the disk surface. Another variation of the slider from FIG. 10 is presented in FIG. 16 and defines a face with side edges 92 which converge as the trailing edge is approached. In this case, the TPC contour width increases while the face width decreases from slider leading to trailing edge. In this embodiment, the decreased face width at the trailing edge contributes to decreased exposure to intermittent slider/disk contact. Additional gas bearing geometries develop when the widths of the TPC and/or face sections are described by shapes of increased complexity. Such a geometry is presented on FIG. 17. In this case, the increased face width near the slider leading and trailing edges contributes to increased gas bearing pitch stiffness. This geometry also contributes to increased ease of implementation of the magnetic transducer into the slider assembly.

Figure 18:
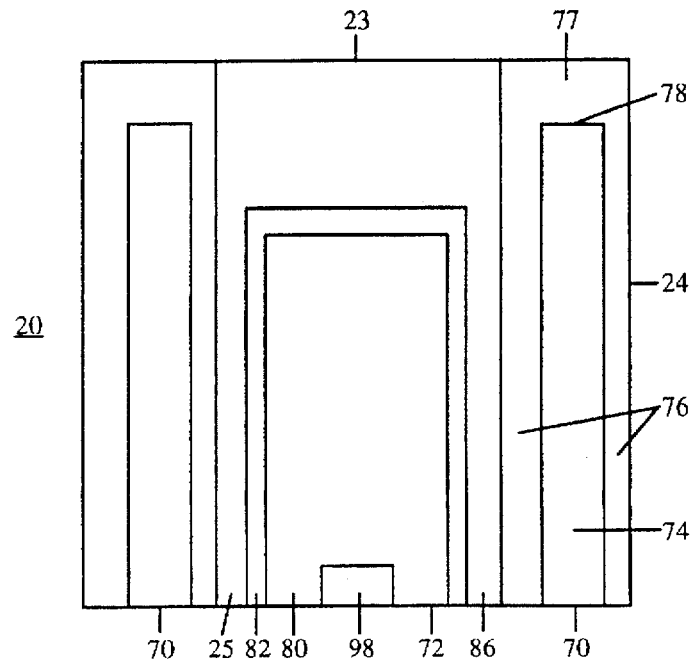

In some situations, there may be an advantage to housing the magnetic transducer (gap) in a relatively flat pad with little or no gas bearing compression inlet or TPC type edge contours. This type of pad would produce relatively little gas bearing load support. What load would be developed would result from compression due to slider pitch and/or roll orientation to the plane of the disk. This "flat gap-pad" or FGP could be positioned in a location desirable from a flying height point of view. As an example, illustrated in FIG. 18, the TNP slider 20 of FIG. 10 could be modified to contain an FGP 98 at the center of the slider trailing edge 25, within the recess region 80 of the NP pad 72. The gap flying height with the slider configuration of FIG. 18 would benefit from relative insensitivity to slider roll angle and the manufacturing tolerances which produce changes in roll angle. In this case, most of the slider positive gas bearing support would still be developed by the outer rails or pads. This arrangement provides a desired maximum gas bearing roll stiffness to the slider for stability and control of the flying height. This may be compared to the case where the "gap-pad" contour is instead configured to develop significant load support, and the gap-pad is still located near the trailing edge center of the slider, while the net applied load force to the slider remains unchanged. In such a case, the outer rafts must be designed to produce less load and thus, produce a slider gas bearing with less roll stiffness. The roll stability of the slider would suffer. Although the top view of the FGP of FIG. 18 is shown to be rectangular, it may also have other shapes. For example, the FGP could have a somewhat streamlined shape front to rear, so as to minimize the accumulation of solid particles near the leading edge of the FGP which can degrade the gas bearing.

In some applications where the slider assembly starts and stops in contact with the disk surface, a more rapid take-off from the disk surface may result when the overall face of the slider air bearing surface possesses a slight amount of curvature. This curvature or "crown" as it is commonly called usually runs in the slider longitudinal direction from the leading edge 23 to the trailing edge 25, and the amount of deviation from a flat plane is typically less than 5μ-inches.

The environment for computer usage is now quite mobile and appears to be headed more and more in that direction. For instance, notebook, subnotebook and smaller computers are commonly used on commercial aircraft. While flying at high altitudes, the cabins of most commercial aircraft are pressurized for passenger safety and comfort. However, the pressure level maintained in high altitude commercial aircraft passenger cabins corresponds to that at around 10,000 feet altitude. At this altitude, the pressure level is around 10.1 psi, compared to 14.7 psi at sea-level. This reduced pressure causes the magnetic heads typically used in hard disk drives to "fly" lower than at sea-level conditions for which they were designed. Lower flying height due to altitude operation can expose the air bearing slider which houses the magnetic head to contact conditions with the recording disk when extreme manufacturing tolerance effects and/or off-design dynamic effects are also present. Contact between head and disk during full speed disk rotation can cause significant wear or damage to the head and disk interface, and loss of recorded data. Such contact is to be avoided if at all possible.

During nominal operation, the air bearing slider floats ("flies") in equilibrium with the applied force to the slider (toward the disk) from its support flexure balancing the overall net air bearing load acting on the slider. The net air bearing load is the integrated air bearing pressure over the various air bearing surfaces of the slider. The weight of the slider is neglected in this discussion since it is typically several orders of magnitude smaller than the applied force or net air bearing load.

The influence of increased altitude (reduced pressure) is to decrease the effectiveness of the various air bearing load generating surfaces on the slider. At reduced pressure, the positive load portions of the air bearing surface (such as the outside rails) produce less of the positive lifting force which tends to separate the slider and disk. Any negative load portions of the air bearing surface (such as the NP recess) produce a decreased magnitude of vacuum force as altitude increases. The magnitude of the net positive lifting force decreases faster than the magnitude of the vacuum force as altitude increases. Since the slider flies in force equilibrium at nominal operating conditions, the net air bearing lifting force must balance the applied force to the slider (toward the disk). Slider types of the prior art which utilize primarily positive lifting force air bearing surfaces include two-rail sliders with tapered or stepped inlets, and with or without TPC features. When subjected to the reduced pressure of increased altitude, this type of slider will migrate to a lower flying height in order for the net air bearing lift force to support the applied force (regardless of altitude, air bearing pressures and lift generated increase as the flying height decreases). The TPC type two-rail slider flying height is less sensitive to increased altitude effects than the more common taper-flat type slider, but the TPC slider still experiences a considerable decrease in flying height with increased altitude (see the curve designated "TPC" on FIG. 19).

In an NP type slider, outside rails provide lifting force while an interior recess creates a partial vacuum condition. In some cases, the recess and rails share a common side edge (see FIG. 1 and U.S. Pat. No. 3,855,625). In others (such as described by Mo in FIG. 4 and U.S. Pat. No. 4,636,894, or by Chapin et al. in U.S. Pat. No. 5,218,494), an isolation channel separates the rail side edge and NP recess side wall. Chapin also describes the inclusion of a stepped rail side edge which extends along only a portion of one of the rail's side edges (the rail side edge adjacent to the NP recess). When subjected to increased altitude, the positive lifting force air bearing surfaces of the NP slider lose their ability to generate lift more rapidly than the NP recesses lose their ability to produce vacuum force. In equilibrium, the slider is subjected to a force balance given by $$Fp-Fv=F \qquad (1)$$

where

Fp=net positive air bearing lifting force due to slider outside rails.

Fv=magnitude of net vacuum (suction) air bearing force due to slider NP recess.

F=applied force to slider from flexure.

At increased altitude, the result is that the flying height will decrease to a point where the difference between the positive and negative load contributions of the air bearing surface can provide the required support of (Fp-Fv) for equilibrium.

Figure 20:
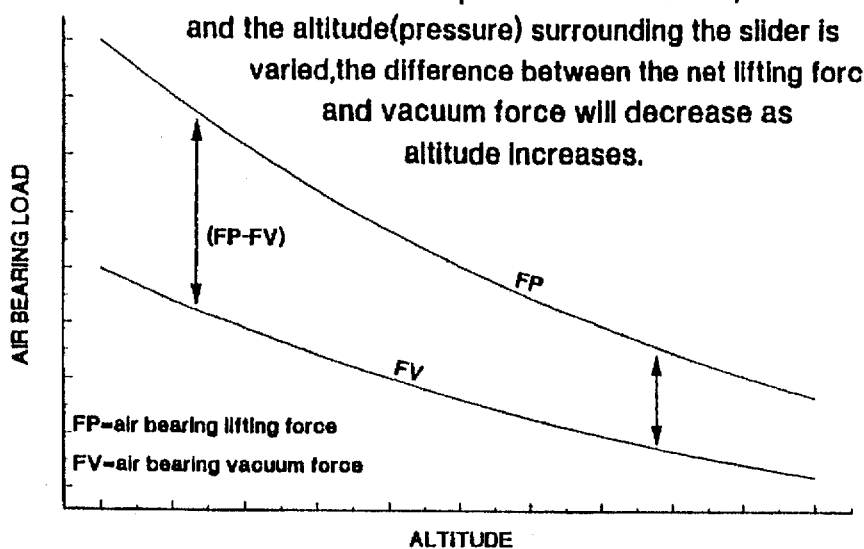
FIG. 20 is a graph of air bearing load as a function of altitude for the positive and vacuum load components of a negative pressure type slider in which the flying height decreases as altitude increases.

The inability of the prior art NP type air bearing to provide a load support compatible with constant flying height as altitude increases is described and explained in the following scenario:

When the NP type slider flies in equilibrium, regardless of the flying height level, the force balance requires that the force difference (Fp-Fv) must equal the applied force "F". However, to explain a decreasing flying height with increased altitude, the air bearing pressure forces generated must satisfy the additional constraint that if the slider is fixed ("frozen") in space at some specific flying height, and if the pressure surrounding the slider is then changed according to an increasing altitude, the difference between the positive and negative air bearing forces will <u>decrease</u>. This is described graphically on FIG. 20.

Figure 21:
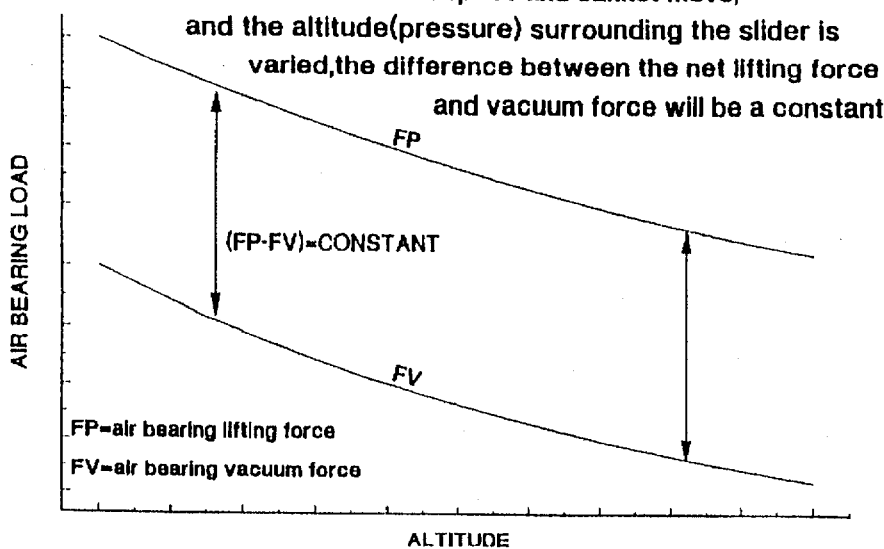
FIG. 21 is a graph of air bearing load as a function of altitude for the positive and vacuum load components of a negative pressure type slider in which the flying height remains constant as altitude changes.

The challenge is to provide an air bearing slider configuration whose load support does not become degraded as altitude increases. In terms of an NP slider, the previous scenario with the rigidly positioned slider requires that as altitude increases, the net positive and negative forces track each other such that the force difference (Fp-Fv) remains constant (as shown on FIG. 21). This condition will insure that a flexure mounted (constant applied force) slider flying on a spinning disk will experience a flying height that remains constant as the altitude changes.

Figure 19:
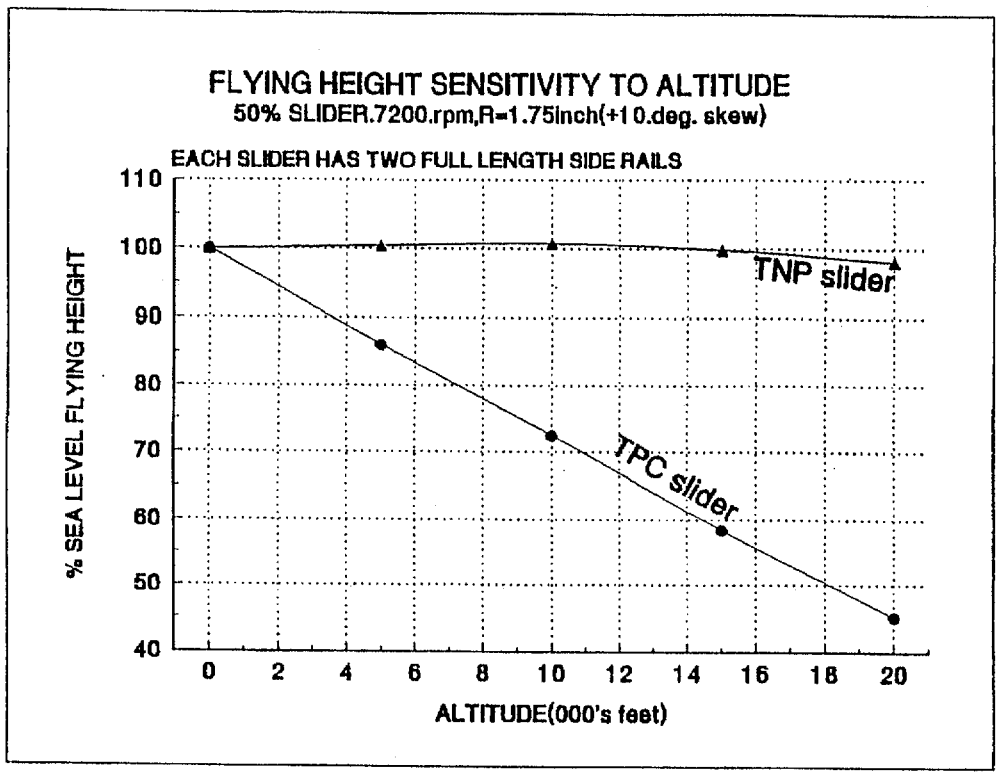
FIGS. 19 is a graph of flying height as a function of altitude for the TNP slider of FIG. 10 and a two rail TPC slider.
Figure 22:
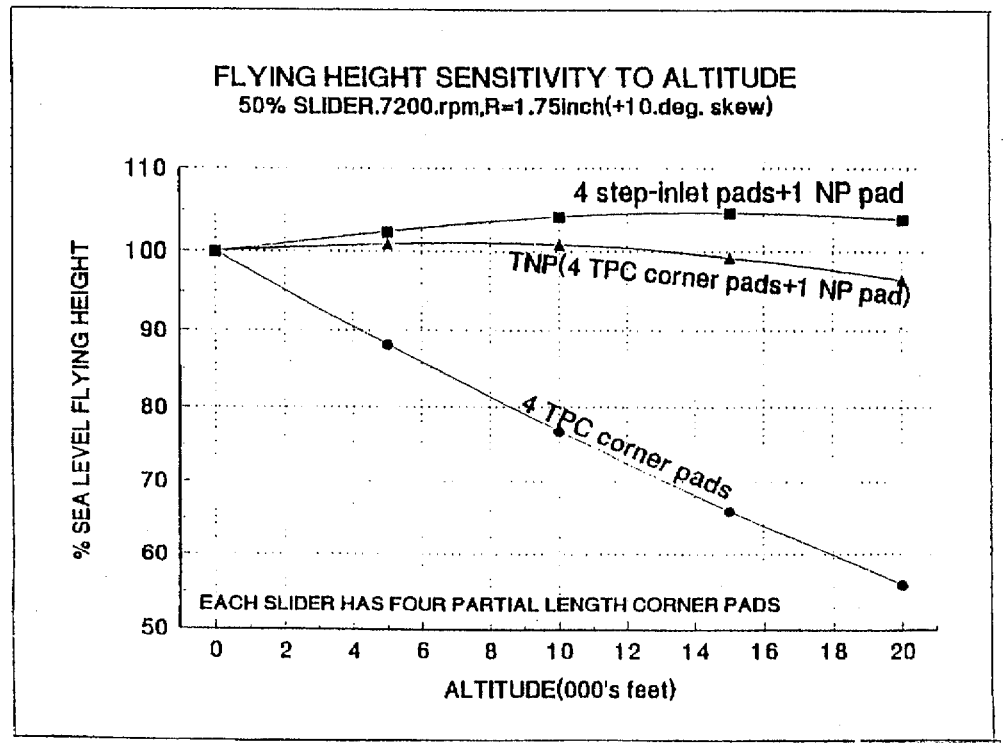
FIG. 22 is a graph of flying height as a function of altitude for the TNP sliders of FIGS. 7 and 24 and a four pad TPC slider.

The TNP air bearing satisfies the condition of a near constant flying height as altitude changes as well as a near constant flying height over the data band of a digital recording surface. In order to provide the required positive load support to the slider, the TPC rails or pads are oversized, i.e. larger than TPC type pads on slider assemblies without NP type pads, and have TPC sections that are generally wider than those found on positive load type air bearings. This enables the positive load rails to very closely track the load degradation of the NP recess as altitude increases (such as required on FIG. 21). The TNP slider can be altitude-insensitive in several geometric configurations. FIG. 19 compares the flying height/altitude response of a two rail TNP slider (FIG. 10) with that of the conventional two rail TPC slider mentioned earlier. In both cases, the sliders are of the 50% format (0.080 in. long by 0.060 in. wide) and fly on a 3.5 inch disk spinning at 7200 rpm. The TPC slider is loaded with 4.0 gf while the TNP slider is loaded with 2.0 gf (NP type sliders are typically more lightly loaded than the corresponding positive load type slider). Both sliders fly at slightly over two microinches at sea level conditions. For the TNP slider, the inside rail width is 0.0150 inch while the outside rail width is 0.0146 inch. The TPC features of the TNP slider occupy 45% of the inside rail width and 46% of the outside rail. The step depth of the TPC features for the TNP slider is 22 microinches. With regard to the NP recess, the recess leading edge is located 0.025 in. behind the slider leading edge, and the recess width is 0.024 in., while the depth is 150 microinches. The width of the ambient reservoir separating the outer TPC rail and NP recess is 20% wider than the corresponding value between the inner TPC rail and NP recess. Flying height of the two rail TNP slider is shown on FIG. 19 as a function of altitude. The TNP flying height is seen to be relatively insensitive to altitude and much less sensitive to altitude than the corresponding two rail TPC slider. Other configurations of the TNP slider are also possible. FIG. 22 presents the flying height sensitivity of a TNP slider composed of four TPC corner pads and an NP recess (as shown on FIG. 7). Also shown for comparison on FIG. 22 is the flying height versus altitude profile of a four corner pad TPC slider (with no NP recess). Both sliders are of the 50% format, and both fly on a 3.5 inch disk spinning at 7200 rpm. The TNP slider flying height is seen to be much less sensitive to altitude than the corresponding four pad TPC slider. Another two rail altitude insensitive TNP slider is shown on FIG. 23. In this embodiment, a full width compression inlet 100 extends across both TPC rails 70 and the NP pad 72. An inlet 102 of each of the TPC sections 76 present along each side edge of each rail originates at a finite distance from the slider leading edge. This TPC location and the full width compression inlet serve to provide increased pitch angle control to the slider and load adjustment to both the TPC and NP pads. The ambient pressure reservoir slots 86 can be deeper than the NP recess (as shown in FIGS. 23) or they can be other depths such as that of the NP recess. Equal depths for the NP recess 80 and ambient pressure reservoir 86 provide for simplification of manufacturing. When the depth of the slots 86 is set at the value of the NP recess 80, very slight variations may occur in the resulting pressure levels in the slots, but the slot pressure is still substantially the ambient level surrounding the slider.

In some cases, acceptable flying height insensitivity to altitude effects can be obtained by inclusion on a slider platform of a combination of one or more gas bearing pads with TPC sections and one or more gas bearing pads without TPC sections, together with NP pad(s) and ambient pressure reservoir(s). Also in some cases, no converging section is included at the leading edge of pads, resulting in reduced pressurization of bearing contours and allowing use of increased width gas bearing pads even as the flying height decreases. In such a case, the positive slider pitch angle will produce the required pressurization of the gas bearing pads so as to support and stabilize the slider in a non-contact position. In some extreme cases, acceptable flying height insensitivity to altitude may be obtained by neglecting gas bearing pads with TPC sections altogether. An example of such a configuration is shown on FIG. 24. The flying height altitude sensitivity of a 50% size slider with air bearing contour of the type shown on FIG. 24 is also included on FIG. 22. In this embodiment, four gas bearing pads 70 with stepped compression inlets 104 provide load support to the slider 20 and balance the vacuum force created in the recess 80 and the externally applied force to the slider toward the disk. By proper selection of the dimensions of the gas bearing pads and the NP recess, the net positive and vacuum loads can be made to approximately track each other with a constant difference as altitude changes, resulting in an approximately constant flying height as altitude changes. However, when no TPC sections are present on the slider air bearing contour, uniformity of flying height over the data band of a rotary actuator disk drive is less precise.

Shallow discontinuous portions of the gas bearing surface of the TNP slider can be formed with such processes as chemical etching, ion milling, or reactive ion etching. These processes are compatible with the requirements of high volume production. There is a general trend toward smaller, higher data storage density, higher data transfer rate information storage products. This has then caused a trend toward smaller, higher rotational speed disks and smaller recording head assemblies. There is no limitation to the applicability of the TNP gas bearing slider as sliders and disks become smaller and rotational speeds increase. The gas used with the TNP slider assembly may be air or some other gas, such as helium.

While the above is a complete description of the preferred embodiments of the invention, various alternatives and modifications and equivalents may be used. Therefore, the above description should not be taken as limiting the scope of the invention, which is defined by the appended claims.

What is claimed is:

1. A method for operating a slider assembly in an environment where altitude changes, wherein the slider assembly is used in connection with a rotating recording medium, the method comprising:

providing the slider assembly with a support structure having a leading edge, a trailing edge, a first side edge, a second side edge, a length and a width, four separate gas bearing pads disposed on said support structure, with at least one of said gas bearing pads being disposed near said leading edge, with at least one of said gas bearing pads being disposed near said trailing edge, with at least one of said gas bearing pads being disposed near the first side edge, and with at least one of said gas bearing pads being disposed near the second side edge, and with each of said gas bearing pads having a width which is less then half of the width of said support structure, a NP type pad defining a recess with an open outlet edge, and an ambient pressure reservoir which separates at least one of said gas bearing pads from said NP type pad, wherein said support structure experiences a net bearing load defined by the difference between a net positive load and a net vacuum load on the support structure during movement of said recording medium;

operating said slider assembly above said rotating recording medium at a preferred operating distance while at a first altitude;

changing the altitude to a second altitude which is at least 1000 feet different than said first altitude, with the net positive load and the net vacuum load tracking each other with a near constant load difference as the altitude changes from the first altitude to the second altitude; and operating said slider assembly above said rotating recording medium at said preferred operating distance while at said second altitude.

2. A method as in claim 1, further comprising maintaining the slider assembly at the preferred operating distance while changing the altitude from the first altitude to the second altitude.

3. A method as in claim 1, wherein said ambient pressure reservoir separates each said gas bearing pad from said NP type pad.

4. A method as in claim 1, wherein at least one of said gas bearing pads includes transverse pressurization contours.

5. A method as in claim 1, wherein the preferred operating distance is less than about 2 microinches above said recording medium.

6. A method as in claim 1, wherein the altitude is changed sufficient to produce a change in the ambient pressure of less than about 4.6 psi.

7. A method as in claim 1, wherein the slider assembly is operated above the recording medium by providing a flexural mounting which applies a constant force on said slider assembly.

8. A method as in claim 1, wherein said at least one gas bearing pad near said leading edge extends backward along the support structure for only a portion of the length of the support structure, and wherein said at least one gas bearing pad near said trailing edge extends forward for only a portion of the length of the support structure, with each gas bearing pad defining a face toward said recording medium, and wherein at least one of the gas bearing pads which is near said leading edge or near said trailing edge is provided with a converging inlet at a leading edge of said pad for pressurizing gas between said face and said recording medium, causing said slider assembly to fly at close proximity to said recording medium during movement of said recording medium.

9. A method as in claim 1, wherein said NP type cavity includes a bearing face, and wherein said recess has a depth with respect to said bearing face of less than about 25 microns, said recess of said NP pad developing a subambient pressure level that attracts said slider assembly toward said recording medium.

10. A method as in claim 1, wherein said ambient pressure reservoir defines a cavity having a depth with respect to said face of said pads sufficient to maintain substantially ambient pressure in said cavity during movement of said recording medium.

11. A method as in claim 1, wherein said gas bearing pads, said NP type pad, and said ambient pressure reservoir cooperate together such that the net positive load and the net vacuum load track each other with a near constant load difference as altitude changes, wherein the slider assembly may operate at the preferred operating distance at both the first and the second altitudes.

12. A method for recording or reading data to or from a rotating recording medium with a slider assembly operating in an environment where altitude changes, the method comprising:
 providing the slider assembly with a support structure having a leading edge, a trailing edge, a first side edge, a second side edge, a length and a width, at least two gas bearing pads disposed on said support structure, with at least one of said gas bearing pads being disposed near the first side edge and near said leading edge and extending backward along said support structure for only a portion of the length of said support structure, with at least one of said gas bearing pads being disposed near the second side edge and near said trailing edge and extending forward along said support structure for only a portion of the length of said support structure, and with each of said gas bearing pads having a width which is less then half of the width of said support structure, a NP type pad defining a recess with an open outlet edge, and an ambient pressure reservoir which separates at least one of said gas bearing pads from said NP type pad, and a recording element, wherein said support structure experiences a net bearing load defined by the difference between a net positive load and a net vacuum load on the support structure during movement of said recording medium;
 positioning said slider assembly above said rotating recording medium with the recording element being at a preferred operating distance while at a first altitude;
 recording or reading data to or from the recording medium with the recording element while at the first altitude;
 changing the altitude to a second altitude which is at least 1000 feet different than said first altitude, with the net positive load and the net vacuum load tracking each other with a near constant load difference as the altitude changes from the first altitude to the second altitude;
 positioning said slider assembly above said rotating recording medium with the recording element being at said preferred operating distance while at said second altitude;
 recording or reading data to or from the recording medium with the recording element while at the second altitude.

13. A method as in claim 12, further comprising maintaining the recording element at the preferred operating distance while changing altitude from the first altitude to the second altitude.

14. A method as in claim 12, wherein said ambient pressure reservoir separates each said gas bearing pad from said NP type pad.

15. A method as in claim 12, wherein at least one of said gas bearing pads includes transverse pressurization contours.

16. A method as in claim 12, wherein the preferred operating distance is less than about 2 microinches.

17. A method as in claim 12, wherein the altitude is changed sufficient to produce a change in the ambient pressure of less than about 4.6 psi.

18. A method as in claim 12, wherein the slider assembly is positioned above the recording medium by providing a flexural mounting which applies a constant force on said slider assembly.

19. A method as in claim 12, wherein said at least one gas bearing pad near said leading edge extends backward along the support structure for only a portion of the length of the support structure, and wherein said at least one gas bearing pad near said trailing edge extends forward for only a portion of the length of the support structure, with each gas bearing pad defining a face toward said recording medium, and wherein at least one of the gas bearing pads which is near said leading edge or near said trailing edge is provided with a converging inlet at a leading edge of said pad for pressurizing gas between said face and said recording medium, causing said slider assembly to fly at close proximity to said recording medium during movement of said recording medium.

20. A method as in claim 12, wherein said NP type cavity includes a bearing face, and wherein said recess has a depth with respect to said bearing face of less than about 25 microns, said recess of said NP pad developing a subambient pressure level that attracts said slider assembly toward said recording medium.

21. A method as in claim 12, wherein said ambient pressure reservoir defines a cavity having a depth with respect to said face of said pads sufficient to maintain substantially ambient pressure in said cavity during movement of said recording medium.

22. A method as in claim 12, wherein said gas bearing pads, said NP type pad, and said ambient pressure reservoir cooperate together such that the net positive load and the net vacuum load track each other with a near constant load difference as altitude changes, wherein the recording element may operate at the preferred operating distance at both the first and the second altitudes.

23. A method as in claim 12, wherein said recording element is housed in a housing pad defining a face toward said recording medium, said housing pad being located near a center of the trailing edge of said support structure, so as to minimize the variation in flying height when the slider exhibits roll or roll motion.

24. A method for recording or reading data to or from a rotating recording medium, the method comprising:
 providing a slider assembly comprising a support structure having a leading edge, a trailing edge, a first side edge, a second side edge, four separate gas bearing pads, with at least one of the gas bearing pads being disposed near the first side edge, and with at least one of the gas bearing pads being disposed near the second side edge, a NP type pad defining a recess with an open outlet edge, an ambient pressure reservoir which separates at least one of said gas bearing pads from said NP type pad, a recording element pad housing a recording element, wherein the recording element pad is located near a center of the trailing edge of said support structure, wherein said support structure experiences a net bearing load defined by the difference between a net positive load and a net vacuum load on the support structure during movement of said recording medium;

positioning said slider assembly above said rotating recording medium at a preferred operating distance while at a first altitude;

recording or reading data to or from the recording medium with the recording element at said first altitude;

changing the altitude to a second altitude which is at least 1000 feet different than said first altitude, with the net positive load and the net vacuum load tracking each other with a near constant load difference as the altitude changes from the first altitude to the second altitude;

positioning said slider assembly above said rotating recording medium with the recording element being at said preferred operating distance while at said second altitude;

recording or reading data to or from the recording medium with the recording element while at the second altitude.

25. A method as in claim 24 wherein said recording element pad is within said NP type cavity.

26. A method for operating a slider assembly in an environment where altitude changes, wherein the slider assembly is used in connection with a rotating recording medium, the method comprising:

providing the slider assembly with a support structure having a leading edge, a trailing edge, a first side edge, a second side edge, a length and a width, at least two gas bearing pads disposed on said support structure, with at least one of said gas bearing pads being disposed near the first side edge and near said leading edge and extending backward along said support structure for only a portion of the length of said support structure, with at least one of said gas bearing pads being disposed near the second side edge and near said trailing edge and extending forward along said support structure for only a portion of the length of said support structure, and with each of said gas bearing pads having a width which is less then half of the width of said support structure, a NP type pad defining a recess with an open outlet edge, and an ambient pressure reservoir which separates at least one of said gas bearing pads from said NP type pad, wherein said support structure experiences a net bearing load defined by the difference between a net positive load and a net vacuum load on the support structure during movement of said recording medium;

operating said slider assembly above said rotating recording medium at a preferred operating distance while at a first altitude;

changing the altitude to a second altitude which is at least 1000 feet different than said first altitude, with the net positive load and the net vacuum load tracking each other with a near constant load difference as the altitude changes from the first altitude to the second altitude; and operating said slider assembly above said rotating recording medium at said preferred operating distance while at said second altitude.

* * * * *

UNITED STATES PATENT AND TRADEMARK OFFICE
CERTIFICATE OF CORRECTION

PATENT NO. : 5,726,831

DATED : March 10, 1998

INVENTOR(S) : James W. White

It is certified that error appears in the above-indentified patent and that said Letters Patent is hereby corrected as shown below:

Title page [54], delete "METHODS FOR OPERATING A GAS BEARING SLIDER" and insert --METHODS FOR OPERATING A GAS BEARING SLIDER WITH REDUCED FLYING HEIGHT SENSITIVITY TO CHANGES IN ALTITUDE--.

Title page [76], delete "154" and insert --152--.

Signed and Sealed this

Seventh Day of July, 1998

*Attest:*

BRUCE LEHMAN

*Attesting Officer*  *Commissioner of Patents and Trademarks*